US011178913B2

(12) United States Patent
Fard et al.

(10) Patent No.: US 11,178,913 B2
(45) Date of Patent: Nov. 23, 2021

(54) APPARATUS AND METHOD FOR COMPONENT LIFETIME MONITORING IN A NETWORK-ENABLED SMOKING SUBSTITUTE DEVICE

(71) Applicant: Nerudia LTD, Liverpool (GB)

(72) Inventors: Daniel Fard, Liverpool (GB); Oliver Talbot, Liverpool (GB)

(73) Assignee: Nerudia LTD, Liverpool (GB)

( * ) Notice: Subject to any disclaimer, the term of this patent is extended or adjusted under 35 U.S.C. 154(b) by 0 days.

(21) Appl. No.: 17/002,247

(22) Filed: Aug. 25, 2020

(65) Prior Publication Data

US 2021/0044690 A1 Feb. 11, 2021

Related U.S. Application Data

(63) Continuation of application No. PCT/EP2019/053519, filed on Feb. 13, 2019.

(30) Foreign Application Priority Data

Feb. 26, 2018 (GB) ..................... 1803027

(51) Int. Cl.
*A24F 40/65* (2020.01)
*A24F 40/53* (2020.01)
(Continued)

(52) U.S. Cl.
CPC .............. *A24F 40/65* (2020.01); *A24F 40/53* (2020.01); *H04B 7/26* (2013.01); *H04M 1/72412* (2021.01); *A24F 40/10* (2020.01)

(58) Field of Classification Search
CPC .......... A24F 40/10; A24F 40/53; A24F 40/65
See application file for complete search history.

(56) References Cited

U.S. PATENT DOCUMENTS 10,737,041 B1 * 8/2020 Adelaar ................ A61M 16/16
2016/0331035 A1 * 11/2016 Cameron ................ A24F 40/65
(Continued)

FOREIGN PATENT DOCUMENTS

| WO | 2017037457 A1 | 3/2017 |
| WO | 2017055802 A1 | 4/2017 |

OTHER PUBLICATIONS

International Search Report, dated Apr. 10, 2019, in PCT/EP2019/053519, filed Feb. 13, 2019.
(Continued)

*Primary Examiner* — David Bilodeau
(74) *Attorney, Agent, or Firm* — Dunlap Codding, P.C.

(57) ABSTRACT

The present disclosure relates to a technique that enables the status of components in a smoking substitute device to be monitored through a portable communication terminal (e.g. mobile phone). The smoking substitute device is configured to communicate wirelessly with the portable communication terminal, e.g. via a wireless personal area network, to transmit component status information. The status information is processed either locally or in the cloud to provide feedback or other notifications to a user of the device or to other parties. The component status information is used to calculate a predicted remaining component lifetime. The feedback can enable pre-emptive action to be taken, e.g. before a component of the device fails or reaches the end of its usable life.

18 Claims, 5 Drawing Sheets

(51) Int. Cl.
  *H04M 1/72412*  (2021.01)
  *H04B 7/26*    (2006.01)
  *A24F 40/10*   (2020.01)

(56) References Cited

U.S. PATENT DOCUMENTS

2017/0013883 A1* 1/2017 Han .................. A24F 40/65
2018/0043114 A1* 2/2018 Bowen ............... A61M 15/003
2018/0184722 A1* 7/2018 Murison ............. F04B 43/046
2018/0303163 A1* 10/2018 Baker ............... A24F 40/50
2019/0000147 A1* 1/2019 Koc .................. A24F 40/50
2019/0158938 A1* 5/2019 Bowen ............... H04M 1/72412
2020/0352249 A1* 11/2020 Achtien ............. A24F 40/65

OTHER PUBLICATIONS

Written Opinion of the International Searching Authority, dated Apr. 10, 2019, in PCT/EP2019/053519, filed Feb. 13, 2019.

\* cited by examiner

APPARATUS AND METHOD FOR COMPONENT LIFETIME MONITORING IN A NETWORK-ENABLED SMOKING SUBSTITUTE DEVICE

CROSS-REFERENCE TO RELATED APPLICATIONS/INCORPORATION BY REFERENCE STATEMENT

The present patent application is a continuation of International Application No. PCT/EP2019/053519, filed Feb. 13, 2019; which claims priority to the patent application identified by GB Serial No. 1803027.0, filed on Feb. 26, 2018. The entire contents of each of the above-referenced patent(s)/patent application(s) are hereby expressly incorporated by reference herein.

TECHNICAL FIELD

The present disclosure relates to smoking substitute devices. In particular, it relates to a network-enabled smoking substitute device, i.e. a smoking substitute device capable of wireless communication with other devices, e.g. over a short range network.

BACKGROUND

The smoking of tobacco is generally considered to expose a smoker to potentially harmful substances. It is generally thought that a significant amount of the potentially harmful substances are generated through the heat caused by the burning and/or combustion of the tobacco and the constituents of the burnt tobacco in the tobacco smoke itself.

Combustion of organic material such as tobacco is known to produce tar and other potentially harmful by-products. There have been proposed various smoking substitute devices in order to avoid the smoking of tobacco.

Such smoking substitute devices can form part of nicotine replacement therapies aimed at people who wish to stop smoking and overcome a dependence on nicotine.

Smoking substitute devices may comprise electronic systems that permit a user to simulate the act of smoking by producing an aerosol, also referred to as a "vapour," that is drawn into the lungs through the mouth (inhaled) and then exhaled. The inhaled aerosol typically bears nicotine and/or flavourings without, or with fewer of, the odour and health risks associated with traditional smoking.

In general, smoking substitute devices are intended to provide a substitute for the rituals of smoking, whilst providing the user with a similar experience and satisfaction to those experienced with traditional smoking and tobacco products.

The popularity and use of smoking substitute devices has grown rapidly in the past few years. Although originally marketed as an aid to assist habitual smokers wishing to quit tobacco smoking, consumers are increasingly viewing smoking substitute devices as desirable lifestyle accessories. Some smoking substitute devices are designed to resemble a traditional cigarette and are cylindrical in form with a mouthpiece at one end. Other smoking substitute devices do not generally resemble a cigarette (for example, the smoking substitute device may have a generally box-like form).

There are a number of different categories of smoking substitute devices, each utilising a different smoking substitute approach. A smoking substitute approach corresponds to the manner in which the substitute system operates for a user.

One approach for a smoking substitute device is the so-called "vaping" approach, in which a vapourisable liquid, typically referred to (and referred to herein) as "e-liquid," is heated by a heating device to produce an aerosol vapour which is inhaled by a user. An e-liquid typically includes a base liquid as well as nicotine and/or flavourings. The resulting vapour therefore typically contains nicotine and/or flavourings. The base liquid may include propylene glycol and/or vegetable glycerin.

A typical vaping smoking substitute device includes a mouthpiece, a power source (typically a battery), a tank for containing e-liquid, as well as a heating device. In use, electrical energy is supplied from the power source to the heating device, which heats the e-liquid to produce an aerosol (or "vapour") which is inhaled by a user through the mouthpiece.

Vaping smoking substitute devices can be configured in a variety of ways. For example, there are "closed system" vaping smoking substitute devices which typically have a sealed tank and heating element which is pre-filled with e-liquid and is not intended to be refilled by an end user. One subset of closed system vaping smoking substitute devices include a main body which includes the power source, wherein the main body is configured to be physically and electrically coupled to a consumable including the tank and the heating element. In this way, when the tank of a consumable has been emptied, the main body can be reused by connecting it to a new consumable. Another subset of closed system vaping smoking substitute devices are completely disposable, and intended for one-use only.

There are also "open system" vaping smoking substitute devices which typically have a tank that is configured to be refilled by a user, so the device can be used multiple times.

An example vaping smoking substitute device is the Myblu™ e-cigarette. The Myblu™ e-cigarette is a closed system device which includes a main body and a consumable. The main body and consumable are physically and electrically coupled together by pushing the consumable into the main body. The main body includes a rechargeable battery. The consumable includes a mouthpiece, a sealed tank which contains e-liquid, as well as a heating device, which for this device is a heating filament coiled around a portion of a wick which is partially immersed in the e-liquid. The device is activated when a microprocessor on board the main body detects a user inhaling through the mouthpiece. When the device is activated, electrical energy is supplied from the power source to the heating device, which heats e-liquid from the tank to produce a vapour which is inhaled by a user through the mouthpiece.

Another example vaping smoking substitute device is the blu PRO™ e-cigarette. The blu PRO™ e-cigarette is an open system device which includes a main body, a (refillable) tank, and a mouthpiece. The main body and tank are physically and electrically coupled together by screwing one to the other. The mouthpiece and refillable tank are physically coupled together by screwing one of the other, and detaching the mouthpiece from the refillable tank allows the tank to be refilled with e-liquid. The device is activated by a button on the main body. When the device is activated, electrical energy is supplied from the power source to a heating device, which heats e-liquid from the tank to produce a vapour which is inhaled by a user through the mouthpiece.

Another approach for a smoking substitute device is the so-called "heat not burn" ("HNB") approach in which tobacco (rather than e-liquid) is heated or warmed to release vapour. The tobacco may be leaf tobacco or reconstituted tobacco. The vapour may contain nicotine and/or flavourings. In the HNB approach the intention is that the tobacco is heated but not burned, i.e. does not undergo combustion.

A typical HNB smoking substitute device may include a main body and a consumable. The consumable may include the tobacco material. The main body and consumable may be configured to be physically coupled together. In use, heat may be imparted to the tobacco material by a heating device that is typically located in the main body, wherein airflow through the tobacco material causes moisture in the tobacco material to be released as vapour. A vapour may be formed from a carrier in the tobacco material (this carrier may for example include propylene glycol and/or vegetable glycerin) and additionally volatile compounds released from the tobacco. The released vapour may be entrained in the airflow drawn through the tobacco.

As the vapour passes through the smoking substitute device (entrained in the airflow) from an inlet to a mouthpiece (outlet), the vapour cools and condenses to form an aerosol (also referred to as a vapour) for inhalation by the user. The aerosol will normally contain the volatile compounds.

In HNB smoking substitute devices, heating as opposed to burning the tobacco material is believed to cause fewer, or smaller quantities, of the more harmful compounds ordinarily produced during smoking. Consequently, the HNB approach may reduce the odour and/or health risks that can arise through the burning, combustion and pyrolytic degradation of tobacco.

An example of the HNB approach is the IQOS™ smoking substitute device from Philip Morris Ltd. The IQOS™ smoking substitute device uses a consumable, including reconstituted tobacco located in a wrapper. The consumable includes a holder incorporating a mouthpiece. The consumable may be inserted into a main body that includes a heating device. The heating device has a thermally conductive heating knife which penetrates the reconstituted tobacco of the consumable, when the consumable is inserted into the heating device. Activation of the heating device heats the heating element (in this case a heating knife), which, in turn, heats the tobacco in the consumable. The heating of the tobacco causes it to release nicotine vapour and flavourings which may be drawn through the mouthpiece by the user through inhalation.

A second example of the HNB approach is the device known as "Glo"™ from British American Tobacco p.l.c. Glo™ comprises a relatively thin consumable. The consumable includes leaf tobacco which is heated by a heating device located in a main body. When the consumable is placed in the main body, the tobacco is surrounded by a heating element of the heating device. Activation of the heating device heats the heating element, which, in turn, heats the tobacco in the consumable. The heating of the tobacco causes it to release nicotine vapour and flavourings which may be drawn through the consumable by the user through inhalation. The tobacco, when heated by the heating device, is configured to produce vapour when heated rather than when burned (as in a smoking apparatus, e.g. a cigarette). The tobacco may contain high levels of aerosol formers (carrier), such as vegetable glycerine ("VG") or propylene glycol ("PG").

The present inventor(s) have observed that most smoking substitute devices currently on the market are configured to operate in isolation of other devices, which limits the functions the smoking substitute devices can perform.

The present disclosure has been devised in light of the above considerations.

BRIEF DESCRIPTION OF THE DRAWINGS

Embodiments and experiments illustrating the principles of the present disclosure will now be discussed with reference to the accompanying figures in which.

DETAILED DESCRIPTION

Figure 1:
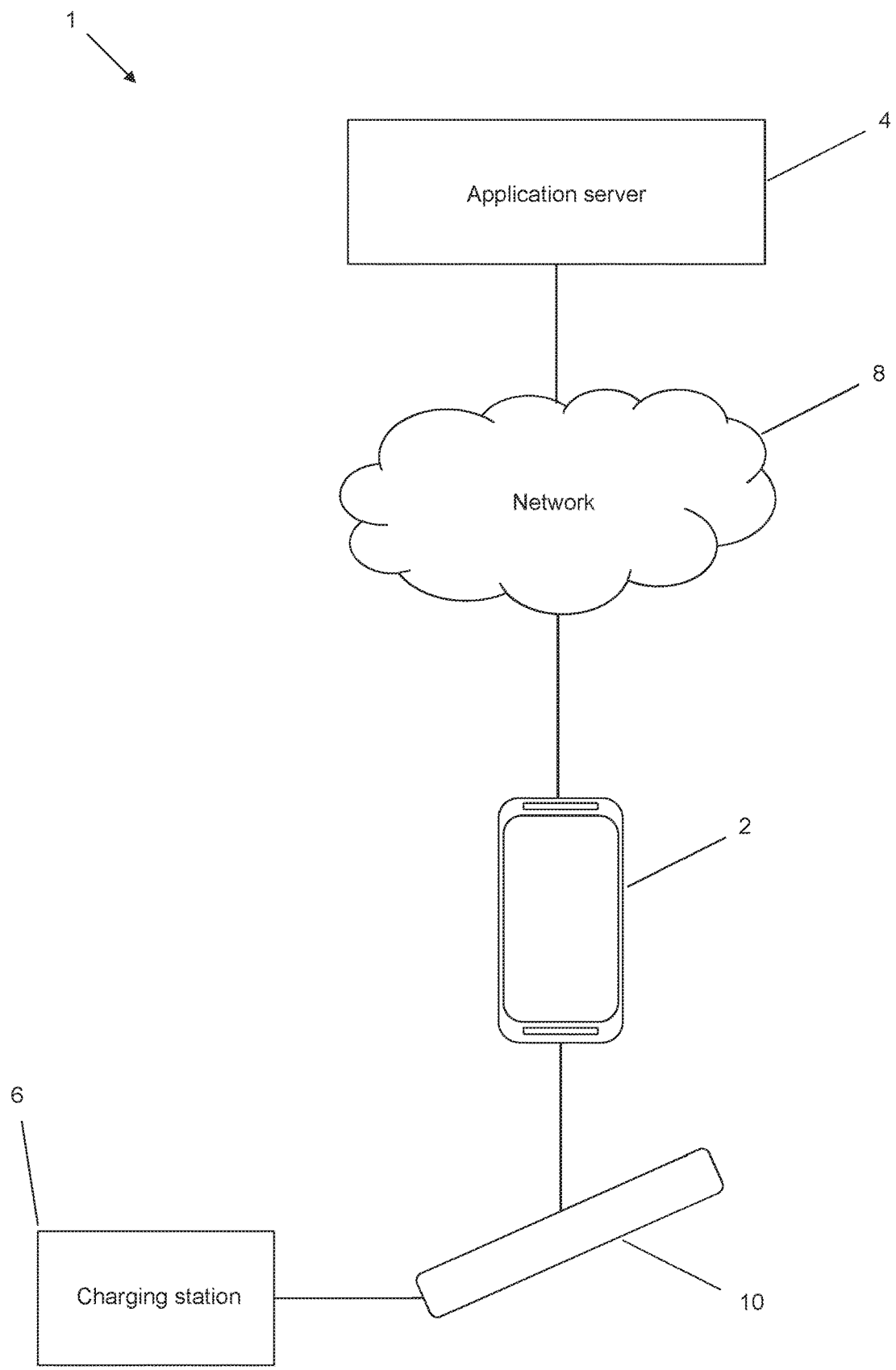
FIG. 1 shows an example system for managing a smoking substitute device.

At its most general, the present disclosure enables the status of components in a smoking substitute device to be monitored through a portable communication terminal (e.g. mobile phone). The smoking substitute device is network-enabled in the sense that it can communicate wirelessly with the portable communication terminal, e.g. to transmit component status information. The portable communication terminal may process status information received from the smoking substitute device either locally or in the cloud to provide feedback or other notifications to a user of the device or to other parties. The feedback can enable pre-emptive action to be taken, e.g. before a component of the device fails or reaches the end of its usable life.

According to a first non-limiting aspect of the present disclosure, there may be provided a computer-implemented method for monitoring component lifetime in a smoking substitute device, the method comprising: transmitting, via a wireless communication channel between the smoking substitute device and a portable communication terminal, component data from the smoking substitute device to the portable communication terminal; calculating, by the portable communication terminal, predicted remaining component lifetime information based on the received component data; and issuing, by the portable communication terminal, a pre-emptive notification if the predicted remaining component lifetime information satisfies a predetermined criterion.

The smoking substitute device may resemble any of the smoking substitute devices discussed above further comprising a wireless interface for establishing and communicating over the wireless communication channel between the smoking substitute device and a portable communication terminal. The wireless interface may utilities any suitable wireless protocol. For example, the wireless interface may operate over a short range network. For example, it may comprise a wireless personal area network (WPAN), e.g. using Bluetooth™, ZigBee, a WiFi personal hotspot or the like. The smoking substitute device may pair with the portable communication terminal over the wireless communication channel. The portable communication terminal may be a master device and the smoking substitute device may be a slave device.

The portable communication terminal may be any communications device capable of wireless interaction with the smoking substitute device, e.g. of over a short range network. The portable communication terminal may be a mobile phone (e.g. smartphone), tablet computer, laptop computer, or the like.

The smoking substitute device may be configured to record, detect or otherwise observe component status information on a regular (e.g. periodic) or ad hoc basis, e.g. under the control of a control unit running on the smoking substitute device. The method may comprise, before the wireless communication channel is established between the smoking substitute device and the portable communication terminal: detecting, by the smoking substitute device, a plurality of component property measurements; and generating, by the smoking substitute device, the component data from the plurality of component property measurements. The component data may be indicative of usage of a battery that supplies power to the smoking substitute device, and/or usage of a consumable that supplies vapour for the smoking substitute device.

The received component data may be processed by the portable communication terminal locally, e.g. using a processor and memory in the portable communication terminal itself. Alternatively, the received component data may be processed by a remote application server (e.g. in the cloud), which is in networked communication with the portable communication terminal. The network communication between the portable communication terminal and the application server may be separate or independent of the wireless communication channel between the smoking substitute device and the portable communication terminal. The network communication may comprise a connection over the world wide web. The network communication may utilise a cellular network or a WiFi network, for example.

Communication between the portable communication terminal and the application server may be controlled by a app running on the portable communication terminal. The app may run in the background on the portable communication terminal to receive the component data and handle subsequent processing. The portable communication terminal may be arranged to re-transmit the component data to the application server for the predicted remaining component lifetime information to be calculated. The predicted remaining component lifetime information may be returned to the portable communication terminal for subsequent action to be determined. Alternatively the subsequent action (e.g. decision about whether or not to issue a notification) may be taken in the application server.

In one example, the method may comprise transmitting, via the wireless communication channel between the smoking substitute device and the portable communication terminal, usage data indicative of one or more activation events at the smoking substitute device. The activation events may correspond to the user inhaling from the smoking substitute device in a manner that causes vapour to be drawn from the consumable. The usage data may include information indicative of the number and duration of activation events. The usage data on the smoking substitute device may be reset following transfer thereof to the portable communication terminal. This ensures that redundant data is not unnecessarily transmitted, which can save battery life.

The step of calculating predicted remaining component lifetime information may comprise: obtaining, by the portable communication terminal, an estimated total lifespan for a component of the smoking substitute device; determining, by the portable communication terminal, an estimated current lifetime of the component using the received component data; and determining, by the portable communication terminal, the predicted remaining component lifetime information for the component from the estimated total lifespan and the estimated current lifetime. The lifetime and lifespan may be expressed as a time, e.g. in hours, minutes or seconds, or may be expressed in terms of discrete events, e.g. number of remaining activation events or the like. The predicted remaining component lifetime information for the component may be obtained by subtracting the estimated current lifetime from the estimated total lifespan.

The received component data may include configuration information for the smoking substitute device. The configuration information may relate to an identity and/or setup of components within the smoking substitute device. Such a configuration may have an impact on the components during each activation event, and therefore may be used to determine the estimated total lifespan.

The method may include obtaining, by the portable communication terminal, a component profile for the component. The component profile may be indicative of expected component behaviour, wherein the estimated total lifespan is calculated with reference to the component profile. The component profile may be based on a component type (e.g. brand or product number) and a known or estimate age of the component, e.g. calculated based on number of completed activation events or the like.

The predicted remaining component lifetime information may also be based on the received configuration information.

The pre-emptive notification may be any suitable message or prompt. Issuing the notification may comprises generating a visible, audible or tactile output on the portable communication device. The nature of the notification may be selectable by the user, e.g. via the app running on the portable communication terminal. Alternatively or additionally, issuing the pre-emptive notification may comprise sending, by the portable communication terminal, a notification to a third party, e.g. to arrange for a component replacement or repair.

The predetermined criterion for issuing the notification may comprise a threshold, whereby a pre-emptive notification is issued if a predicted remaining lifetime for the component falls below the threshold. The method may thus comprise comparing, by the portable communication terminal, the predicted remaining component lifetime information to threshold information to determine whether or not the predicted remaining component lifetime information satisfies the predetermined criterion.

In another non-limiting aspect, the present disclosure may provide a smoking substitute device comprising: a control unit; a memory storing computer readable instructions for execution by the control unit, wherein the control unit is configured to record component data for the device and store the component data on the memory; and a wireless interface configured to: establish a wireless communication channel with a portable communication terminal, and transmit the component data over the wireless communication channel.

The smoking substitute device may comprise a battery that supplies power to the smoking substitute device, wherein the component data is indicative of usage of the battery.

The smoking substitute device may comprise a consumable that supplies vapour for the smoking substitute device, wherein the component data is indicative of usage of the consumable.

In another non-limiting aspect, the present disclosure may provide an apparatus for monitoring component lifetime in a smoking substitute device, the apparatus comprising a portable communication terminal configured to communicate with the smoking substitute device via a wireless communication channel, wherein the portable communication terminal is configured to: receive, via the wireless communication channel, component data from the smoking substitute device; calculate predicted remaining component lifetime information based on the received component data; issue a pre-emptive notification if the predicted remaining component lifetime information satisfies a predetermined criterion. The apparatus may also include the smoking substitute device discussed above.

In yet another non-limiting aspect, the present disclosure may comprise a computer program product comprising a computer-readable storage medium having computer-readable instructions stored thereon, wherein the computer-readable instructions are executable as an app in a portable communication terminal to perform the method of monitoring component lifetime in a smoking substitute device disclosed above.

The present disclosure includes the combination of the aspects and particular features described except where such a combination is clearly impermissible or expressly avoided.

Aspects and embodiments of the present disclosure will now be discussed with reference to the accompanying figures. Further aspects and embodiments will be apparent to those skilled in the art. All documents mentioned in this text are incorporated herein by reference.

FIG. 1 shows an example system 1 for managing a smoking substitute device 10.

The system 1 as shown in FIG. 1 includes a mobile device 2, an application server 4, an optional charging station 6, as well as the smoking substitute device 10.

The smoking substitute device 10 is configured to communicate wirelessly, e.g. via Bluetooth™, with an application (or "app") installed on the mobile device 2, e.g. via a suitable wireless interface (not shown) on the mobile device 2. The mobile device 2 may be any portable communication terminal capable of running an app, such as a mobile phone or smartphone, a tablet computer, or a laptop computer, for example. The application on the mobile phone is configured to communicate with the application server 4, via a network 8. The application server 4 may utilise cloud storage, for example.

The network 8 may include a cellular network and/or the internet.

A skilled person would readily appreciate that the mobile device 2 may be configured to communicate via the network 8 according to various communication channels, such as (but not limited to) a wireless communication channel such as via a cellular network (e.g. according to a standard protocol, such as 3G or 4G) or via a WiFi network.

The app installed on the mobile device and the application server 4 may be configured to assist a user with their smoking substitute device 10, based on information communicated between the smoking substitute device 10 and the app and/or information communicated between the app and the application server 4.

The charging station 6 (if present) may be configured to charge (and optionally communicate with) the smoking substitute device 10, via a charging port on the smoking substitute device 10. The charging port on the smoking substitute device 10 may be a USB port, for example, which may allow the smoking substitute device to be charged by any USB-compatible device capable of delivering power to the smoking substitute device 10 via a suitable USB cable (in this case the USB-compatible device would be acting as the charging station 6). Alternatively, the charging station could be a docking station specifically configured to dock with the smoking substitute device 10 and charge the smoking substitute device 10 via the charging port on the smoking substitute device 10.

Figure 2A:
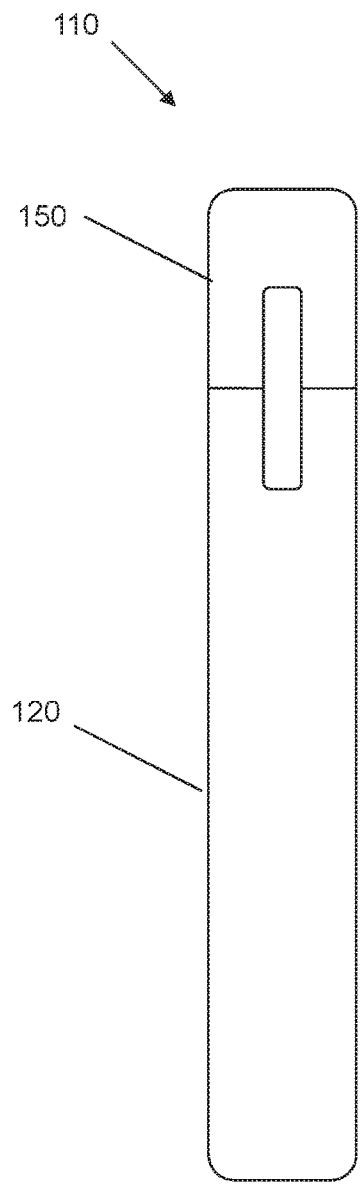
FIG. 2(a) shows an example smoking substitute device for use as the smoking substitute device in the system of FIG. 1.

FIG. 2(a) shows an example smoking substitute device 110 for use as the smoking substitute device 10 in the system 1 of FIG. 1.

In this example, the smoking substitute device 110 includes a main body 120 and a consumable 150. The consumable 150 may alternatively be referred to as a "pod."

In this example, the smoking substitute device 110 is a closed system vaping device, wherein the consumable 150 includes a sealed tank 156 and is intended for one-use only.

FIG. 2(a) shows the smoking substitute device 110 with the main body 120 physically coupled to the consumable 150.

Figure 2B:
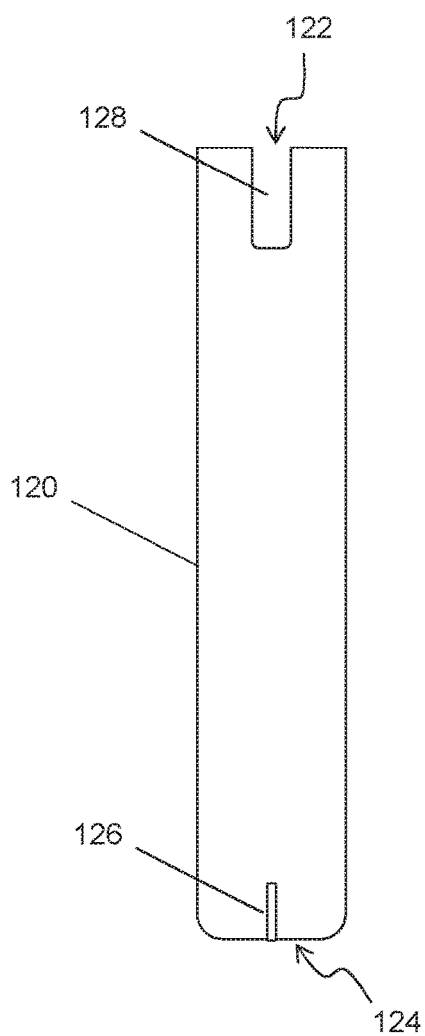
FIG. 2(b) shows the main body of the smoking substitute device of FIG. 2(a) without the consumable.

FIG. 2(b) shows the main body 120 of the smoking substitute device 110 without the consumable 150.

Figure 2C:
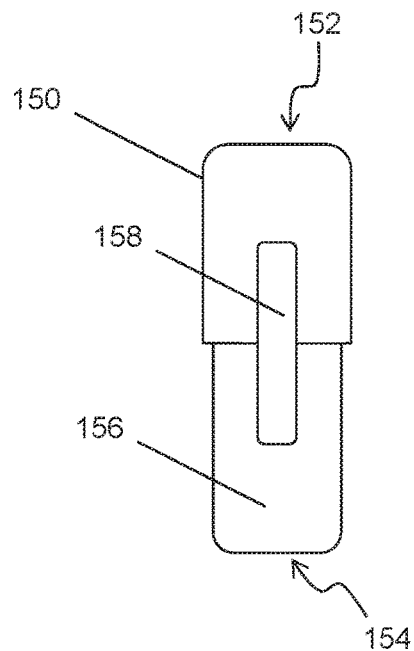
FIG. 2(c) shows the consumable of the smoking substitute device of FIG. 2(a) without the main body.

FIG. 2(c) shows the consumable 150 of the smoking substitute device 110 without the main body 120.

The main body 120 and the consumable 150 are configured to be physically coupled together, in this example by pushing the consumable 150 into an aperture in a top end 122 of the main body 120. In other examples, the main body 120 and the consumable could be physically coupled together by screwing one onto the other, or through a bayonet fitting, for example. An optional light 126, e.g. an LED located behind a small translucent cover, is located a bottom end 124 of the main body 120. The light 126 may be configured to illuminate when the smoking substitute device 110 is activated.

The consumable 150 includes a mouthpiece (not shown) at a top end 152 of the consumable 150, as well as one or more air inlets (not shown in FIG. 2) so that air can be drawn into the smoking substitute device 110 when a user inhales through the mouthpiece. At a bottom end 154 of the consumable 150, there is located a tank 156 that contains e-liquid. The tank 156 may be a translucent body, for example.

In certain non-limiting embodiments, the tank 156 includes a window 158, so that the amount of e-liquid in the tank 156 can be visually assessed. The main body 120 includes a slot 128 so that the window 158 of the consumable 150 can be seen whilst the rest of the tank 156 is obscured from view when the consumable 150 is inserted into the aperture in the top end 122 of the main body 120.

The tank 156 may be referred to as a "clearomizer" if it includes a window 158, or a "cartomizer" if it does not.

Figure 3A:
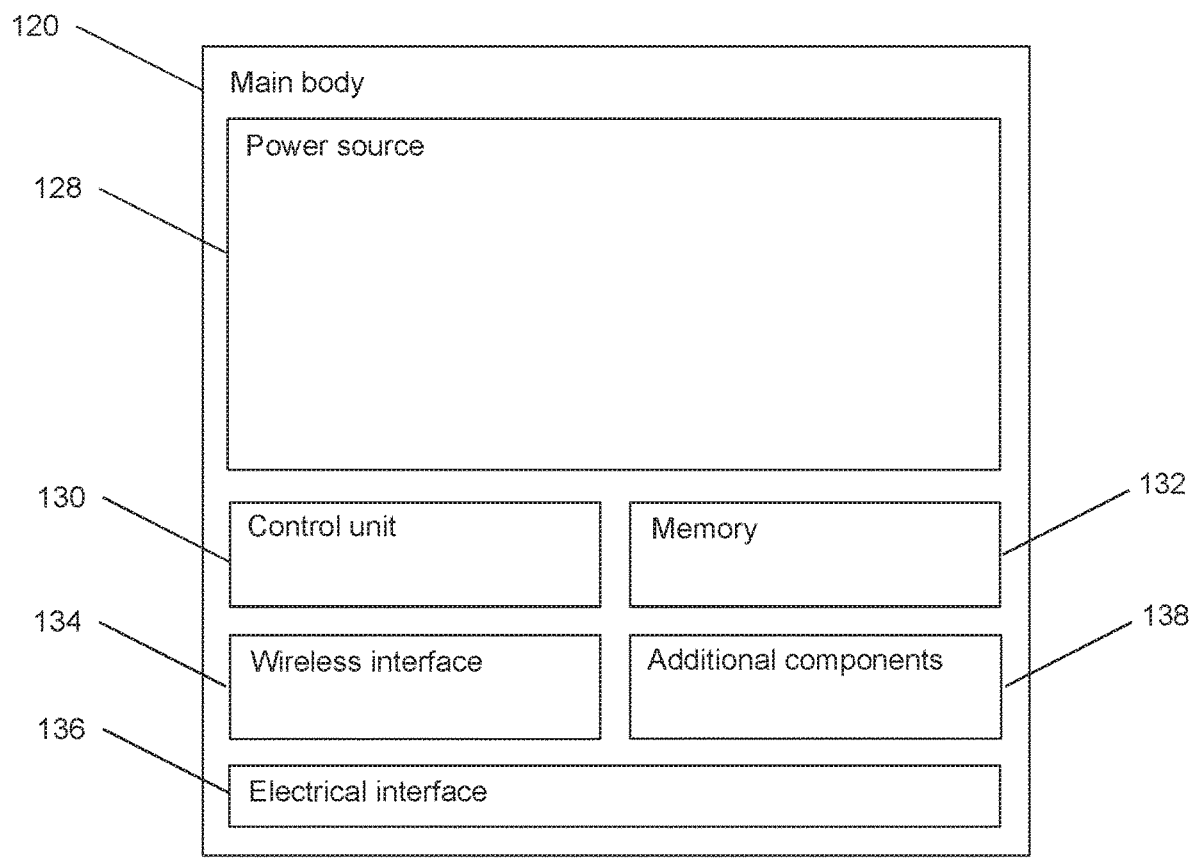
FIG. 3(a) is a schematic view of the main body of the smoking substitute device of FIG. 2(a).

FIG. 3(a) is a schematic view of the main body 120 of the smoking substitute device 110.

Figure 3B:
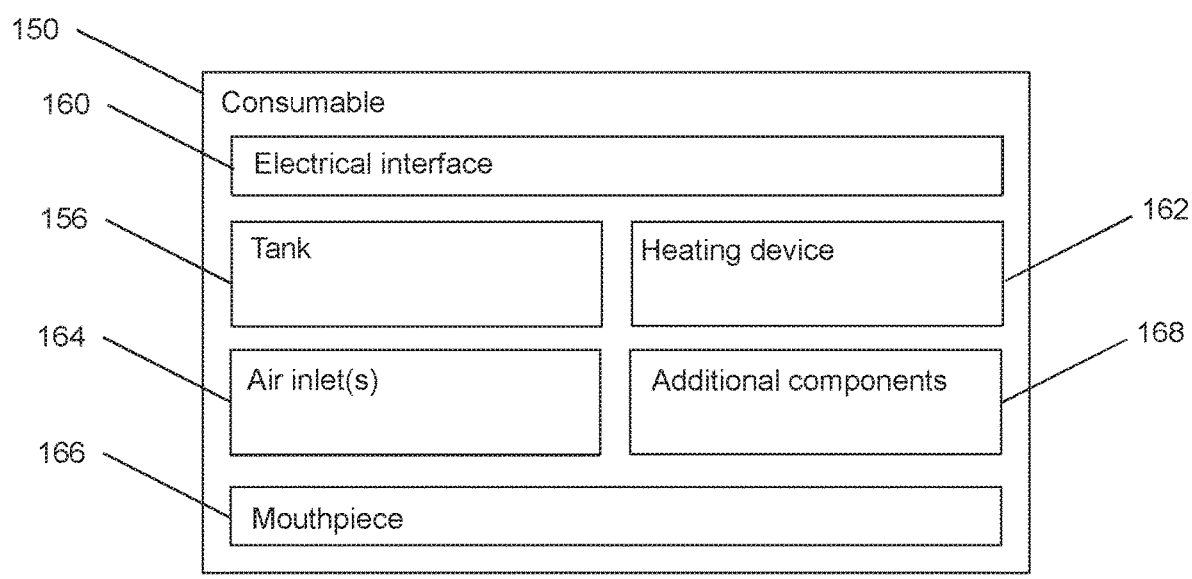
FIG. 3(b) is a schematic view of the consumable of the smoking substitute device of FIG. 2(a).

FIG. 3(b) is a schematic view of the consumable 150 of the smoking substitute device 110.

As shown in FIG. 3(a), the main body 120 includes a power source 128, a control unit 130, a memory 132, a wireless interface 134, an electrical interface 136, and, optionally, one or more additional components 138.

In certain non-limiting embodiments, the power source 128 is a battery, such as (but not limited to) a rechargeable battery.

The control unit 130 may include a microprocessor, for example.

The memory 132 may include non-volatile memory for storing computer readable instructions which, when executed, control operation of the device. In this example, the memory may include storage for component and usage data as discussed in more detail below.

In certain non-limiting embodiments, the wireless interface 134 is configured to communicate wirelessly with the mobile device 2 via a short range wireless network, e.g. a wireless personal area network (WPAN). The wireless interface 134 may be incorporate any suitable short-distance wireless technology, e.g. Bluetooth™, ZigBee, Wireless USB, or the like. To this end, the wireless interface 134 could include a Bluetooth™ antenna. Other wireless communication interfaces, e.g. WiFi, are also possible.

The electrical interface 136 of the main body 120 may include one or more electrical contacts. The electrical interface 136 may be located in, and in certain non-limiting embodiments at the bottom of, the aperture in the top end 122 of the main body 120. When the main body 120 is physically coupled to the consumable 150, the electrical interface 136 may be configured to pass electrical power from the power source 128 to (e.g. a heating device of) the consumable 150 when the smoking substitute device 110 is activated, e.g. via the electrical interface 160 of the consumable 150 (discussed below). When the main body 120 is not physically coupled to the consumable 150, the electrical interface may be configured to receive power from the charging station 6.

The additional components 138 of the main body 120 may include the optional light 126 discussed above.

The additional components 138 of the main body 120 may, if the power source 128 is a rechargeable battery, include a charging port configured to receive power from the charging station 6. This may be located at the bottom end 124 of the main body 120. Alternatively, the electrical interface 136 discussed above is configured to act as a charging port configured to receive power from the charging station 6 such that a separate charging port is not required.

The additional components 138 of the main body 120 may, if the power source 128 is a rechargeable battery, include a battery charging control circuit, for controlling the charging of the rechargeable battery. However, a battery charging control circuit could instead be located in the charging station 6 (if present).

The additional components 138 of the main body 120 may include an airflow sensor for detecting airflow in the smoking substitute device 110, e.g. caused by a user inhaling through a mouthpiece 166 (discussed below) of the smoking substitute device 110. The smoking substitute device 110 may be configured to be activated when airflow is detected by the airflow sensor. This optional sensor could alternatively be included in the consumable 150 (though this is less desired (but not by way of limitation) where the consumable 150 is intended to be disposed of after use, as in this example).

The additional components 138 of the main body 120 may include an actuator, e.g. a button. The smoking substitute device 110 may be configured to be activated when the actuator is actuated. This provides an alternative to the airflow sensor noted, as a mechanism for activating the smoking substitute device 110.

As shown in FIG. 3(b), the consumable 150 includes the tank 156, an electrical interface 160, a heating device 162, one or more air inlets 164, a mouthpiece 166, and, optionally, one or more additional components 168.

The electrical interface 136 of the main body 120 and an electrical interface 160 of the consumable 150 are configured to cooperate in a manner that electrically couples the main body 120 to the consumable 150. The electrical coupling may permit electrical power and, optionally, data to pass between the main body 120 and consumable 150. The electrical interface 160 of the consumable 150 may include one or more electrical contacts configured to physically contact the electrical interface 136 of the main body 120. In this way, electrical energy (e.g. in the form of an electrical current) is able to be supplied from the power source 128 in the main body 120 to the heating device 162 in the consumable 150.

In certain non-limiting embodiments, the heating device 162 is configured to heat e-liquid contained in the tank 156, e.g. using electrical energy supplied from the power source 128. In one example, the heating device 162 may include a heating filament and a wick, wherein a first portion of the wick extends into the tank 156 in order to draw e-liquid out from the tank 156, and wherein the heating filament coils around a second portion of the wick located outside the tank 156. In this example, the heating filament is configured to heat up e-liquid drawn out of the tank 156 by the wick to produce an aerosol vapour.

In certain non-limiting embodiments, the one or more air inlets 164 are configured to allow air to be drawn into the smoking substitute device 110, when a user inhales through the mouthpiece 166.

In use, a user activates the smoking substitute device 110, e.g. through actuating an actuator included in the main body 120 or by inhaling through the mouthpiece 166 as described above. Upon activation, the control unit 130 may supply electrical energy from the power source 128 to the heating device 162 (via electrical interfaces 136, 166), which may cause the heating device 162 to heat e-liquid drawn from the tank 156 to produce a vapour which is inhaled by a user through the mouthpiece 166.

Of course, a skilled reader would readily appreciate that the smoking substitute device 110 shown in FIGS. 2(a), 2(b), and 2(c) and FIGS. 3(a) and 3(b) shows just one example implementation of a smoking substitute device, and that other forms of smoking substitute device could be used as the smoking substitute device 10 of FIG. 1.

By way of example, a HNB smoking substitute device including a main body and a consumable could be used as the smoking substitute device 10 of FIG. 1, instead of the smoking substitute device 110. One such HNB smoking substitute device is the IQOS™ smoking substitute device discussed above.

As another example, an open system vaping device which includes a main body, a refillable tank, and a mouthpiece could be used as the smoking substitute device 10 of FIG. 1, instead of the smoking substitute device 110. One such open system vaping device is the blu PRO™ e-cigarette discussed above.

As another example, an entirely disposable (one use) smoking substitute device could be used as the smoking substitute device 10 of FIG. 1, instead of the smoking substitute device 110.

Embodiments of the present disclosure relate to the configuration and use of a network-enabled smoking substitute device such as that discussed above for monitoring the status (in particular in relation to remaining lifetime or risk of malfunction) of components in the device. The component for monitoring may include any one or more of the power source, heating device, consumable, etc. In embodiments of the present disclosure, the main body may be configured to transmit wirelessly information relating to the monitored components to the mobile device 2. An app running on the mobile device may process the received information to determine status information for the components and to determine whether or not to issue a notification for pre-emptive action based on that status information.

The present disclosure may make utilise data recorded by the smoking substitute device, e.g. concerned device usage or configuration to establish a current status and usage configuration for a component of the device. This information can be used, e.g. by the app running on the mobile device, to obtain a predicted remaining lifetime for the component. Because real information from the device is used in this process, the remaining lifetime may be calculated more accurately than in an arrangement based on averaged or standard observations.

Moreover, the present disclosure may make use of the communications capability of the mobile device that is connectable to the smoking substitute device to enable pre-emptive action to be taken before a component fails, e.g. by reaching the end of its lifetime or otherwise malfunctioning. The pre-emptive action may be taken directly, e.g. automatically based on the determined status information for a component, or indirectly, e.g. by issuing a notification to a user or supplier to recommend that further action is taken.

Figure 4:
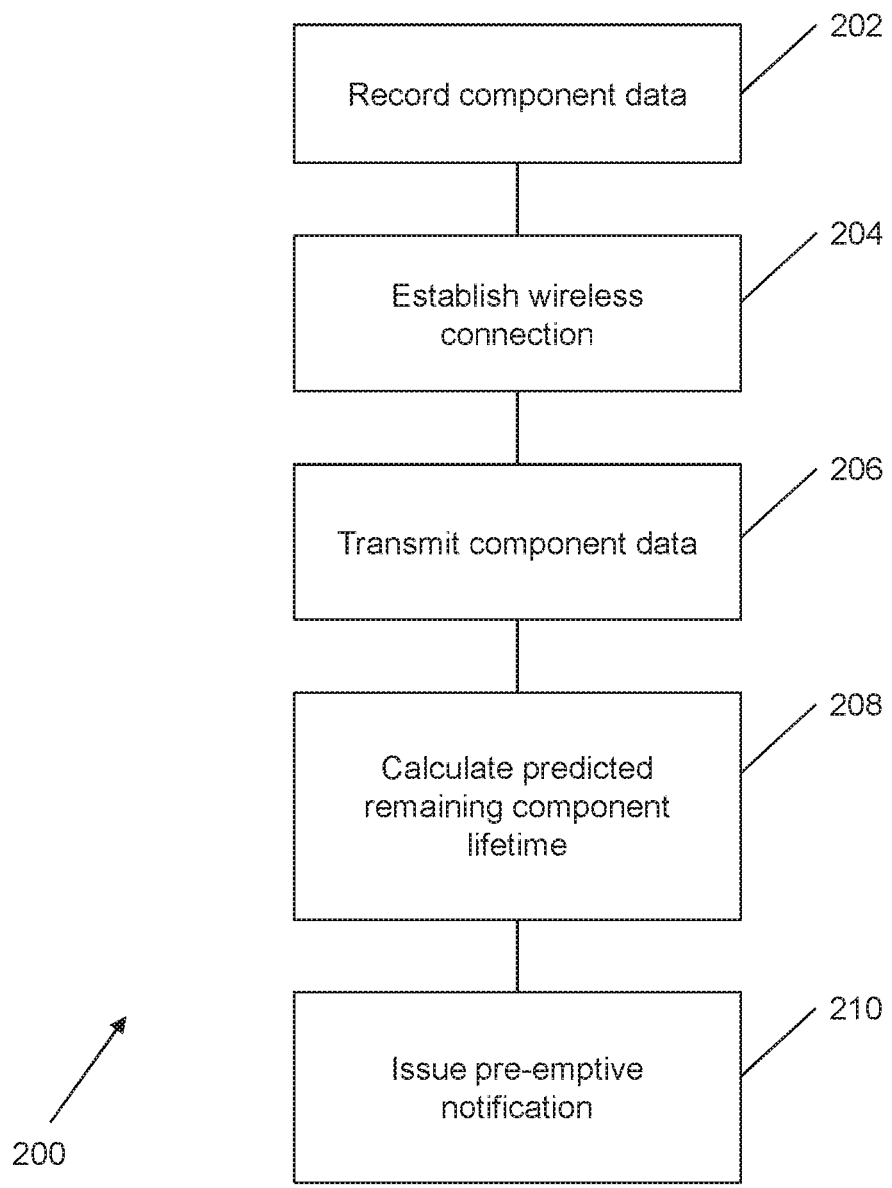
FIG. 4 a flow chart of a component lifetime monitoring method that is an embodiment of the present disclosure.

FIG. 4 is a flow chart showing steps in a component lifetime monitoring method 200 that is an embodiment of the present disclosure. The method 200 begins with a step 202 of recording component data in a smoking substitute device (such as the device 110 discussed above). Herein "component" may refer to any constituent part of the smoking substitute device. The component may be a part that is capable of replacement or repair, such as the power source in the main body. Alternatively or additionally, the component may be a part of the consumable, e.g. the tank, heating device or the like. The component data may be recorded in a regular (e.g. periodic) or ad hoc manner. The component data may be obtained by measuring or otherwise detecting a property of a component, where the property of the component exhibits a change over the lifetime of the component.

The step 202 may thus include detecting, by the smoking substitute device, a plurality of component property measurements. The component data may be generated from the plurality of component property measurements, e.g. as a component data log.

In one example, the component may be a battery for the device, and the recorded data may comprise a battery data log. The battery data log may be a data structure that is indicative of battery status measurements recorded by the smoking substitute device. In one example, the control unit 130 of the main body 120 is arranged to execute a routine that measures a charge-related property of the battery and record the result with a time stamp in the memory 132. The battery data log may be a collection of this type of battery status measurements.

The charge-related property of the battery may be any parameter that allows the battery's remaining charge to be calculated. For example, the charge-related property may be the battery's voltage. The routine may be executed periodically, whereby the battery data log is indicative of the change over time of the voltage. In another example, the charge-related property may be indicative of drawn charge from the battery, e.g. measured by the amount of current drawn together with the period for which it was drawn. In this example, the routine may be executed for each activation event of the device, e.g. each time a user inhales to draw vapour.

In another example, the component may be a tank for the device, and the recorded data may comprise a usage data log. The usage data may be indicative of how a user has used the device, e.g. in terms of the nature of the activation events that consume liquid from the tank. The usage data may include information indicative of the number and duration of activation events.

In another example, the component data may relate to the configuration of the device, e.g. the type of battery or the power configuration of the device which may affect the voltage applied to the heating element on each activation event.

The component data may be stored in the memory of the smoking substitute device based on a routine executed by the control unit.

The method 200 continues with a step 204 of establishing a wireless connection between the smoking substitute device and a mobile device (such as the mobile device 2 discussed above). The wireless connection may be via any suitable wireless protocol that permits transmission of information. For example, the smoking substitute device may pair with the mobile device using a short range transmission protocol such as Bluetooth™ or the like. The smoking substitute device may be wirelessly connectable to the mobile device via any suitable personal area network.

The method continues with a step 206 of transmitting, from the smoking substitute device to the mobile device over the established wireless connection, the recorded component data.

The component data (in particular any time-based usage data) may be renewed or restarted after it has been successfully transmitted to the mobile device. For example, a portion (or partition) of the memory in the device that is allocated for the component data may be cleared following successful transmission of the data. In this way, information from a certain time period need only be transmitted once to the mobile device. Minimising data transfer in this way can reduce the load placed on the battery by the wireless communication module.

The component data received at the mobile device may be stored locally on the device or may be re-transmitted to an application server for subsequent processing. It is to be understood that the present disclosure contemplates processing either locally (at the mobile device) or remotely (e.g. in a cloud-based application server). The received component data may be consolidated with previously received component data (e.g. obtained from an earlier wireless connection between the smoking substitute device and the mobile device. In this way, the mobile device (or the application server) may obtain a complete component data history for the smoking substitute device.

The method continues with a step 208 of calculating a current status for one or more components in the device. In this example, this step is embodied as a calculation of a predicted remaining lifetime for the one or more components. However, it may be understood that the current status may be indicative of other parameters, e.g. risk of malfunction, remaining capacity, etc.

The step 208 of calculating utilizes the received component data, either alone or as part of the component data history, in conjunction with a component profile. The component profile may be or be used to obtain an estimated lifespan for the component. The estimated lifespan may be expressed in fixed terms, e.g. as a number of uses of the component (e.g. charge cycles for a battery or activation events for a heating device). Alternatively, the estimated lifespan may depend on how the component is used or how the device is configured. In this case, usage or configuration information received from the smoking substitute device may be used to derive an estimated lifespan based on the information in the component profile. For example, for a given device power configuration, a heating element or battery may have a different expected lifespan. By taking the power configuration into account, the method can obtain an estimated lifespan that accurately reflects the particular device being monitored.

The received component data or the component data history may be used to determine an estimated current lifetime of the component. In certain non-limiting embodiments, the estimated current lifetime of the component is expressed in the same terms as the estimated lifespan, e.g. number of completed charge cycles for a battery, or number of activation events for a heating element or consumable. Again, the actual usage of the device, e.g. the power configuration settings in place for the activation events, may be used to determine the estimated current lifetime.

In one example, the component being monitored may be the battery, e.g. a lithium cell. The component data may include information relate to the charging cycle of the battery, e.g. the number of charging cycles, and/or more sophisticated information relating to the duration of charging event and the start and finish capacity for each charging cycle. The component profile for the battery may include a recommended lifespan expressed in terms of a number of charge cycles (e.g. 300 charge cycles). The mobile device (or application server) may arranged to determine from the configuration data an estimated number of completed charge cycles for the battery. This may be compared with the recommended lifespan to determine a predicted remaining lifetime. As discussed below, if the predicted remaining lifetime is equal to or fewer than a threshold number of charge cycles, a notification may be issued.

In another example, the component being monitored may be the consumable of the device (or pod). The component data may relate to usage of the device, i.e. number and/or duration of activation events. For example, the component data (or complete component data history) may indicate that 150 activation events each lasting 3 seconds have been completed for the consumable, such that a total completed activation event duration for the consumable is 450 seconds. Meanwhile, the component profile for the consumable may be used to obtain an estimated total available activation event duration for the consumable. This parameter may depend on the configuration of the device, e.g. the capacity of the tank, the power configuration. Accordingly, the mobile device (or application server) may use device information received from the smoking substitute device to obtain the estimated total available activation event duration. The estimated total available activation event duration may be compared with the total completed activation event duration to determine a predicted remaining activation event duration. As discussed below, if the predicted remaining activation event duration is equal to or less than a threshold, a notification may be issued.

Following calculation of the predicted remaining component lifetime, the method continues with a step 210 of issuing a pre-emptive notification. The method may be arranged to issue notifications only in certain circumstances, e.g. when the predicted remaining component lifetime is below a threshold. The threshold may be stored in the mobile device or application server. It may be adjustable, e.g. to allow a user to control when the notification is issued. The method may thus include comparing the predicted remaining component lifetime to a corresponding threshold, and determining whether or not to issue a notification based on that comparison.

The notification may be issued by the mobile device itself, e.g. to the user. The notification may be visible, audible, tactile or a combination thereof. For example, the notification may cause the mobile device to vibrate and simultaneously display a banner with a message that is indicative of the battery-related event. The manner in which the notification is issued may be controlled by the user in a conventional manner.

Alternatively or additionally, the notification may be issued to a third party, e.g. a component supplier. Such a notification may be sent from the mobile device or the application server, e.g. as an email or the like.

In one example, where the component being monitored is the battery, the notification may be issued to a user to suggest purchase of a new battery. The notification may be sent in a message (e.g. an email or the like) with a link to facilitate on-line purchase of a suitable battery. Alternatively, the notification may be issued directly to a battery supplier to request sending of a replacement to the user, e.g. where the user has pre-paid for a replacement or is otherwise entitled to an automatic replacement.

In another example, where the component being monitored is the consumable, the notification may be issued to a user to suggest purchase of a new pod. Again, the notification may be sent in a message (e.g. an email or the like) with a link to facilitate on-line purchase of a suitable consumable. Alternatively, the notification may be issued directly to a supplier to request sending of a replacement to the user, e.g. where the user has pre-paid for a replacement or is otherwise entitled to an automatic replacement. The pre-emptive notification may include other suggestions, e.g. aimed at prolonging the lifetime of the consumable. For example, the notification may suggest a switching the device to a different power configuration to conserve liquid in the tank.

The method discussed above may present the user with pre-emptive notifications, i.e. information that enables a user to take preventative or remedial action in advance of a component failing or being exhausted. The method may thus prevent unwanted breaks in device availability.

Figure 5:
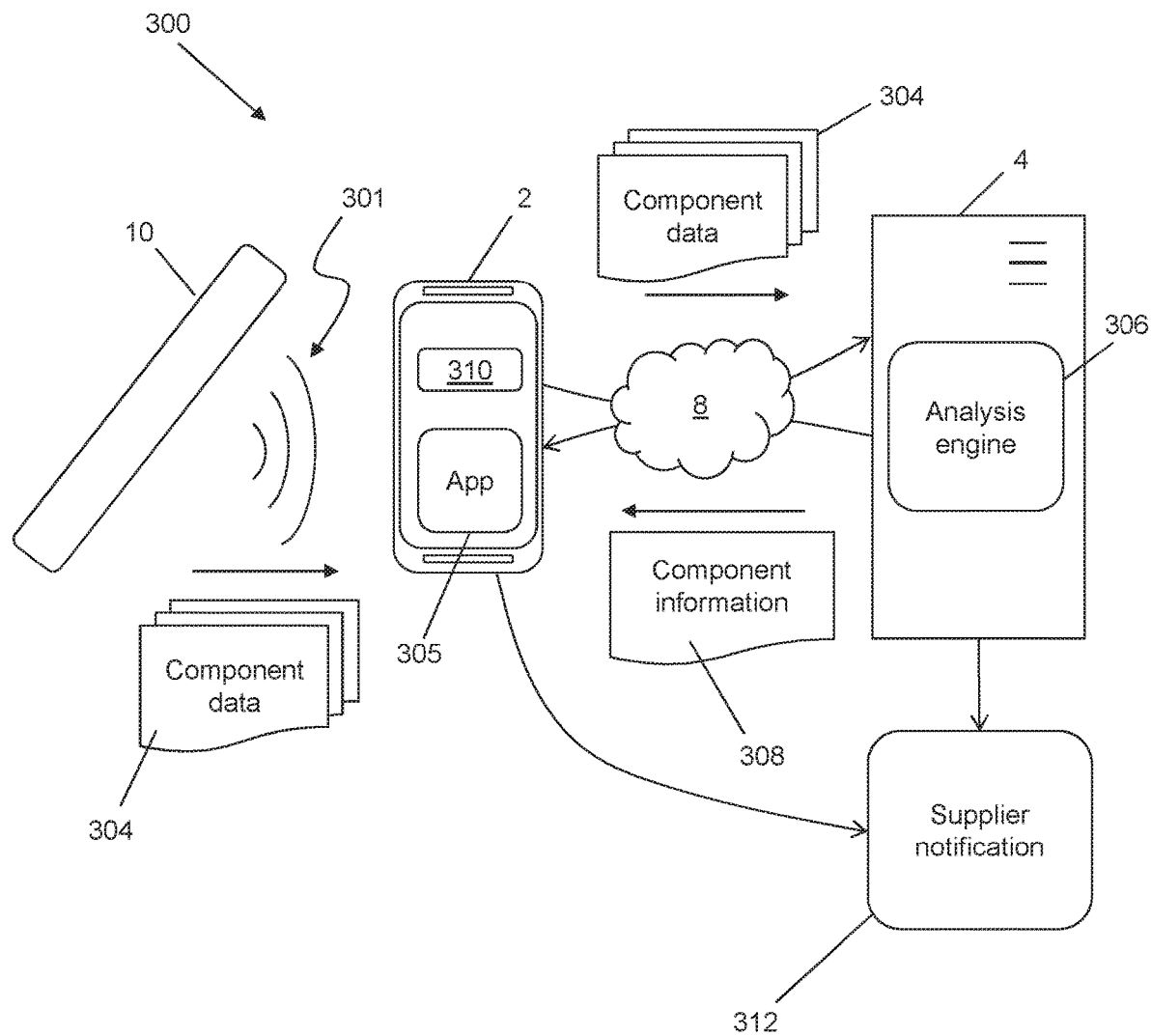
FIG. 5 is a schematic view of a component lifetime monitoring apparatus that is an embodiment of the present disclosure.

FIG. 5 is a schematic view of a component lifetime monitoring apparatus 300 that is an embodiment of the present disclosure. The apparatus 300 comprises the mobile device 2 and smoking substitute device 10 discussed above. The smoking substitute device 10 is in wireless communication with the mobile device over a suitable short range network 301, over which it transmits the component data 304 and other device information as discussed above.

The mobile device 2 executes an app 305, e.g. in the background, which receives the component data 304 and, in this example, re-transmits it over network 8 to a remote application server 4. The application server 4 executes an analysis engine 306 to process the received component data, e.g. in conjunction with component profile information as discussed above, to generate component information 308. The component information 308 may comprise the predicted remaining lifetime for the component. The app 305 may be configured to display this information upon receiving a suitable request from the user, e.g. via an user interface provided by the app. The component information 308 may further include an instruction for issuing a notification. However, it can be understood that the app running on the mobile device may instead determine whether or not to issue a notification based on the component information 308, e.g. taking into account user preferences which may be stored locally.

The app 305 may be arranged to display a notification 310 on the mobile device 2 itself. The mobile device 2 may comprise a display screen as is conventional. The notification 310 may show information indicative of the predicted remaining component lifetime together with any suggested pre-emptive action.

Alternatively or additionally, the mobile device 2 or the application server 306 may be arranged to issue a notification 312 to a supplier.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the present disclosure in diverse forms thereof.

While the present disclosure has been described in conjunction with the exemplary embodiments described above, many equivalent modifications and variations will be apparent to those skilled in the art when given this disclosure. Accordingly, the exemplary embodiments of the present disclosure set forth above are considered to be illustrative and not limiting. Various changes to the described embodiments may be made without departing from the spirit and scope of the present disclosure.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include," and variations such as "comprises," "comprising," and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

The invention claimed is:

1. A computer program product for monitoring component lifetime in a smoking substitute device, the computer program product comprising a non-transitory computer-readable storage medium having computer-readable instructions stored thereon, wherein the computer-readable instructions are executable as an app in a portable communication terminal to perform the method of: Transmitting, via a wireless communication channel between the smoking substitute device and the portable communication terminal, component data from the smoking substitute device to the portable communication terminal; calculating, by the portable communication terminal, predicted remaining component lifetime information based on the received component data, wherein calculating predicted remaining component lifetime information comprises the steps of: obtaining, by the portable communication terminal, an estimated total lifespan for a component of the smoking substitute device; determining, by the portable communication terminal, an estimated current lifetime of the component using received component data; and determining, by the portable communication terminal, the predicted remaining component lifetime information for the component from the estimated total lifespan and the estimated current lifetime; and issuing, by the portable communication terminal, a pre-emptive notification if the predicted remaining component lifetime information satisfies a predetermined criterion.

2. The computer program product of claim 1, wherein the computer-readable instructions further comprising, before the wireless communication channel is established between the smoking substitute device and the portable communication terminal, the steps of:
detecting, by the smoking substitute device, a plurality of component property measurements; and
generating, by the smoking substitute device, the component data from the plurality of component property measurements.

3. The computer program product of claim 1, wherein the component data is indicative of:
usage of a battery that supplies power to the smoking substitute device; or
usage of a consumable that supplies vapour for the smoking substitute device.

4. The computer program product of claim 1, wherein the computer-readable instructions further comprising the step of transmitting, via the wireless communication channel between the smoking substitute device and the portable communication terminal, usage data indicative of one or more activation events at the smoking substitute device.

5. The computer program product of claim 4, wherein the usage data includes information indicative of the number and duration of activation events.

6. The computer program product of claim 1, wherein the received component data include configuration information for the smoking substitute device, and wherein the estimated total lifespan is determined based on the configuration information.

7. The computer program product of claim 1, wherein the computer-readable instructions further comprising the step of obtaining, by the portable communication terminal, a component profile for the component, wherein the estimated total lifespan is based on the obtained component profile.

8. The computer program product of claim 1, wherein the received component data include configuration information for the smoking substitute device, and wherein the predicted remaining component lifetime information is based on the configuration information.

9. The computer program product of claim 1, wherein the predicted remaining component lifetime information comprise a predicted remaining lifetime for the component.

10. The computer program product of claim 9, wherein the predetermined criterion comprises a threshold, whereby a pre-emptive notification is issued if a predicted remaining lifetime for the component falls below the threshold.

11. The computer program product of claim 1, wherein the computer-readable instructions further comprising the step of comparing, by the portable communication terminal, the predicted remaining component lifetime information to threshold information to determine whether or not the predicted remaining component lifetime information satisfies the predetermined criterion.

12. The computer program product of claim 1, wherein the step of issuing the pre-emptive notification comprises generating a visible, audible or tactile output on the portable communication device.

13. The computer program product of claim 1, wherein the step of issuing the pre-emptive notification comprises sending, by the portable communication terminal, a notification to a third party.

14. An apparatus for monitoring component lifetime in a smoking substitute device, the apparatus comprising:
   a portable communication terminal; and,
   a smoking substitute device having:
      a control unit;
      a memory storing computer readable instructions for execution by the control unit, wherein the control unit is configured to record component data for the device and store the component data on the memory; and
      a wireless interface configured to:
         establish a wireless communication channel between the smoking substitute device and the portable communication terminal, and
         transmit the component data over the wireless communication channel;
   wherein the portable communication terminal is configured to receive the component data transmitted over the wireless communication channel, and calculate predicted remaining component lifetime information based on the received component data; and;
   wherein calculating the predicted remaining component lifetime information, the portable communication terminal is configured to
   obtain an estimated total lifespan for a component of the smoking substitute device;
   determine an estimated current lifetime of the component using the received component data; and
   determine the predicted remaining component lifetime information for the component from the estimated total lifespan and the estimated current lifetime; and
   wherein the portable remaining component terminal is configured to issue a pre-emptive notification to the smoking substitute device if the predicted remaining lifetime information satisfies a predetermined criterion.

15. The apparatus of claim 14, wherein the smoking substitute device further comprises a battery that supplies power to the smoking substitute device, wherein the component data is indicative of usage of the battery.

16. The apparatus of claim 14, further comprising a consumable that supplies vapour for the smoking substitute device, wherein the component data is indicative of usage of the consumable.

17. An apparatus for monitoring component lifetime in a smoking substitute device, the apparatus comprising:
   a portable communication terminal configured to communicate with the smoking substitute device via a wireless communication channel, wherein the portable communication terminal is configured to:
      receive, via the wireless communication channel, component data from the smoking substitute device;
      calculate predicted remaining component lifetime information based on the received component data, wherein in calculating the predicted remaining component lifetime information, the portable communication terminal is configured to:
         obtain an estimated total lifespan for a component of the smoking substitute device;
         determine an estimated current lifetime of the component using the received component data; and
         determine the predicted remaining component lifetime information for the component from the estimated total lifespan and the estimated current lifetime; and
      wherein the portable communication terminal is configured to issue a pre-emptive notification to the smoking substitute device if the predicted remaining component lifetime information satisfies a predetermined criterion.

18. The apparatus of claim 17, wherein the portable communication terminal is a mobile phone.

* * * * *